United States Patent Office 3,504,085
Patented Mar. 31, 1970

3,504,085
PROCESS FOR PREPARATION OF AN ANTI-EDEMATIC COMPOSITION
Peter Wilhelm Patt and Günther Karl Wilhelm Vogel, Cologne, Germany, assignors to Dr. Madaus & Co., Cologne, Germany
No Drawing. Filed May 3, 1966, Ser. No. 553,686
Claims priority, application Germany, May 28, 1965, M 65,393
Int. Cl. A61k 27/14
U.S. Cl. 424—195    4 Claims

ABSTRACT OF THE DISCLOSURE

An anti-edematic preparation is obtained by disintegrating citrus peels in water to form a paste, separating and concentrating a clear solution from the paste, precipitating the concentrate with an aqueous ammonium sulfate solution and drying and pulverizing the precipitate.

---

This invention relates to the preparation of biologically active compositions from citrus fruits.

It is well known that citrus fruits contain quite a number of components which have interesting therapeutical and pharmacological properties. In this respect, the best known compounds are the vitamins and provitamins. Also biologically active flavonoid complexes have been prepared from citrus peels and pulps.

We have found that, also from citrus fruits, heretofore unknown compositions can be obtained which have no flavonoid character and combine very high anti-inflammatory and anti-edematic effects with high water solubility.

Said compositions are obtained by extracting the peels of citrus fruits with water and obtaining from such aqueous extract a precipitate by treatment with a water soluble electrolyte. Such electrolytes are well known from the fractionated preparation of proteins having well defined molecular weight ranges.

Suitable citrus fruits are particularly all types of oranges (Citrus aurantium) but to a lesser extent also grapefruits and other citrus species. For the extraction, they can be employed in form of the disintegrated fruits after removal of the juice, or as dried unripe fruits; preferably the dried peels are used. The most effective electrolyte appears to be ammonium sulfate.

In practice, the pulverized fruits are homogenized with five to ten times the amount of water to a slurry and thereby extracted. The disintegrated cells and floating particles are removed by centrifuging or filtration. To the thus obtained clear solution, there is added, with stirring, half to double the volume of a saturated aqueous electrolyte solution, preferably ammonium sulfate. A very fine precipitate is obtained; after 12 to 24 hours, the precipitation is completed.

The collected precipitate may be centrifuged and then dried, e.g. under reduced pressure at about 50° C. The dried product is readily ground to a dry non-hygroscopic powder.

Said powder, which, as a result of the preparation method, cannot contain any effective amounts of flavonoid or similar compounds, shows high anti-inflammatory efficiency. In the rats feet test, it inhibits the formation of edemas after application of histamine, serotonin, kaolin, Formalin, and bradykinin.

The deff 30%, i.e. the dose which produces in a sufficiently large number of animals an average edema inhibition of 30%, is for the rats feet ovalbumin edema=1 mg./kg. (with i.v. application). This is a potency which is about 12 times greater than that obtained with hydrocortisone phosphate.

When the product is compared with phenylbutazone, which is a well known anti-phlogisticegent, the strong anti-inflammatory effect is still more pronounced. Phenylbutazone inhibits the ovalbumin edema of rats at a dose of 60 mg./kg. The dextran edema is inhibited by 200 mg./kg. (R. Domenjoz, Naunyn-Schmiedebergs Arch. exp. Path Pharmark. 225, 14, 1955). For the inhibition of the kaolin and Formalin edema, at least 100 mg./kg. are required (W. Theobald, Inaug. Diss. Homburg/Saar, 1954). Therefore, the product prepared by the method of the invention has an anti-inflammatory potency which is about 60 to 200 times stronger than that of phenylbutozone.

Said product is also able to increase the capillary resistancy (the so-called petechia test) of the rat feet with a vitamin-P deficient diet. The capillary permeability, when tested by the effect on the rat polyvinyl pyrrolidone edema (see G. Vogel. M.-L. Marek Arzneimittelforschung 11, 356, 1961) or at the transfer of liquid and polyvinyl pyrrolidone from the plasma into the lymph, demonstrates sealing of the capillary membranes against water and macromolecules. Capillary permeability, when increased by histamine or physiologically active polypeptides such as bradykinin and callidin, is normalized by the product of the invention.

At doses of 0.5 to 2.5 mg. in 0.5 ml. of water per heart in isolated guinea pig hearts (Langendorf), the product can increase the coronary perfusion by more than 60 percent.

Finally, the product of the invention has excellent compatibility. Up to 100 mg./kg. i.v. do not produce in cats any noticeable blood pressure reaction in the arterial system.

The product is particularly useful in combination with saponins having somewhat different anti-edematic properties, such as aescin.

The following examples are given to illustrate the invention:

EXAMPLE 1

An aqueous extract is prepared from 2.6 kg. of fresh orange residues from juice production. About 5 to 10 times the amount of water is added, and the mass is disintegrated so as to obtain a homogeneous paste within about 1 hour.

Thereby, the viscosity of the paste will depend on the type of fruit used ad on its pectin content. In accordance with said viscosity, the amount of water to be employed must be adjusted to obtain a clear solution after the solid components and dispersed particles have been removed by centrifuging and/or filtering.

By drying said solutions under reduced pressure at a temperature of about 50° C., a dark brown hygroscopic residue in an amount of about 3.5 to 4 percent, calculated on the weight of the peels, is obtained, which is the starting material for the preparation of the biologically active composition of the invention.

20 g. of said dried residue are suspended in 400 to 800 ml. of water and filtered from the insoluble material. Then, about the same volume of a saturated ammonium sulfate solution (about 40% by weight) is added, and the combined solutions are allowed to stand for about 24 hours. There is obtained a fine precipitate which is separated from the supernatant solution by centrifuging or filtering.

The obtained precipitate has a viscous consistency but, after drying, can be readily pulverized, preferably under reduced pressure at 50° C. The end product is a brown powder, in an amount of about 10 percent by weight of the starting material, and is no longer hygroscopic.

EXAMPLE 2

1 kg. of dried orange peels are homogenized with 15 liter of water to a paste and an aqueous extract free of cellular particles and suspensoids is prepared as set forth in Example 1. The extract is dried under reduced pressure at 50° C. and processed as in Example 1.

In a modified preparation method, the extract is not dried but only concentrated to about 1.5 to 3 liter and then mixed with the same volume (1.5 to 3 liter) of an aqueous saturated ammonium sulfate solution. The further procedure is as set forth in Example 1.

Instead of orange peels, peels of grapefruits or other citrus fruits can be used.

EXAMPLE 3

The end product obtained according to Example 1 or 2 is extracted with pure methanol, and then filtered. The filtered methanolic solution is adjusted to a pH of 8–9 by means of methanolic KOH. A precipitate forms which, after standing over night, is centrifuged.

Then the precipitate is suspended in water, and the suspension is adjusted, by means of a mineral acid, e.g., hydrochloric or sulfuric acid, to a pH of about 3.5, whereby the precipitate is dissolved. After filtration, the filtrate is neutralized with ammonia, and the water is evaporated.

The product is again dissolved in methanol to separate it from the ammonium salts, which remain as solid residue.

The final purified product is readily soluble and can be applied as a 1–10, preferably 5% aqueous sterile solution in veterinary medicine for the treatment of traumatic and other edemas. It is used for intravenous injections in amounts of about 25 mg. per 70 kg. of the weight of the animal to be treated, also for prophylactic purposes.

Instead of using methanol as solvent for the preparation of the purified product, ethanol and other lower alcohols can be employed.

EXAMPLE 4

The product obtained according to the preceding examples is exhaustively extracted with ethyl acetate acetic ester. The active principle remains undissolved and can then be dried, preferably in vacuo at 50° C.

We claim:

1. A method of obtaining an anti-edematic preparation from the peels of citrus fruits comprising: disintegrating said peels in from 5 to 15 times the amount of water to obtain a homogeneous paste; separating the solid components from said paste to obtain a clear solution; concentrating said solution to an amount of from 10 to 20 percent of its original volume; mixing with the resultant concentrate half to double the volume of a saturated aqueous ammonium sulfate solution; allowing the resultant mixture to stand to form a precipitate; separating said precipitate from said mixture and drying said precipitate; and pulverizing the dried precipitate to obtain a powder.

2. The method as claimed in claim 1 including the further steps of extracting the pulverized powder with methanol; adjusting the methanolic extract solution to a pH of from 8 to 9 with a methanolic solution of potassium hydroxide and forming a precipitate; suspending the precipitate in water; adjusting the aqueous suspension to a pH of about 3.5 with a mineral acid to dissolve the precipitate; neutralizing the resultant solution with ammonia; drying the neutralized solution; dissolving the resultant product in methanol; and separating solid ammonium salts therefrom.

3. The method as claimed in claim 1 wherein the peels are dried peels and are disintegrated in 15 times the amount of water.

4. The method as claimed in claim 1 wherein the solution obtained from the homogeneous paste is concentrated by the steps of drying said solution to obtain a residue in an amount of from 3.5 to 4 percent by weight of said peels; suspending and mixing said residue in 20 to 40 times the amount of water; and separating insoluble material from the resultant mixture.

References Cited

UNITED STATES PATENTS 2,727,891    12/1955    Kosserow et al.    424—195

FRANK CACCIAPAGLIA, Jr., Primary Examiner